(12) United States Patent
Lafornara et al.

(10) Patent No.: US 7,376,975 B2
(45) Date of Patent: May 20, 2008

(54) ENHANCING DIGITAL RIGHTS MANAGEMENT SYSTEM SECURITY THROUGH POLICY ENFORCEMENT

(75) Inventors: Philip Lafornara, Bellevue, WA (US); Rushmi U. Malaviarachchi, Redmond, WA (US); John L. Manferdelli, Redmond, WA (US); Michael David Marr, Sammamish, WA (US); Charles F. Rose, III, Redmond, WA (US); Bradley Serbus, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 716 days.

(21) Appl. No.: 10/842,061

(22) Filed: May 10, 2004

(65) Prior Publication Data
US 2005/0257271 A1    Nov. 17, 2005

(51) Int. Cl.
*G06K 9/00* (2006.01)
(52) U.S. Cl. .............................. 726/27; 726/26; 726/2
(58) Field of Classification Search ................. 726/27, 726/30, 26, 2
See application file for complete search history.

(56) References Cited

OTHER PUBLICATIONS

TCPA / Palladim Frequently Asked Questions Version 0.1 Jun. 26, 2002 , http://www.cl.cam.ac.uk/~rja14/tcpa-faq-0.2.html, year 2002.*
Clarifying Mlsinformation on TCPA, David Safford, IBM Research, Oct. 2002.*
Trusted Computing Group—Wikipedia, the free encyclopedia, year 2007.*
PKI and digital certification infrastructure Hunt, R.; Networks, 2001. Proceedings. Ninth IEEE International Conference on Oct. 10-12, 2001 pp. 234-239.*
Configureing enterprise public key infrastructures to permit integrated deployment of signature, encryption and access control systems Williams, C.K.; Military Communications Conference, 2005. MILCOM 2005. IEEE Oct. 17-20, 2005 pp. 2172-2175 vol 4.*
Flexible License Management Mechanism for Group Distribution Liu, Zonghua, Guangqing; Kim, Tae-min; Lee, Byungwook; Han, Myung-Mook; Future Generation Communication and Networking vol. 2, Dec. 6-8, 2007 pp. 548-552.*

* cited by examiner

*Primary Examiner*—David Y Jung
(74) *Attorney, Agent, or Firm*—Woodcock Washburn LLP

(57) ABSTRACT

In order to allow for security beyond revocation lists, a policy regarding when permissions may be granted (in the form of a rights document, e.g. a use license or a certificate) is enforced. When a request is made for a rights document, the requester submits an account certificate which includes certain metadata regarding the requester. This metadata is analyzed to determine whether it meets a specific policy before the request is granted. If the request is not granted, the cause of the rejection may be overcome, for example by updating or upgrading some system component (hardware or software) in the requesting system. In certain cases, such an update to overcome a policy-based rejection may be performed transparently to the user.

34 Claims, 5 Drawing Sheets

ENHANCING DIGITAL RIGHTS MANAGEMENT SYSTEM SECURITY THROUGH POLICY ENFORCEMENT

FIELD OF THE INVENTION

This invention relates generally to the field of computing, and particularly to a digital rights management (DRM) system. More particularly, the invention relates to the provision of strong content protection and automatic application of security updates by examining details regarding a security component being used to facilitate the DRM system.

BACKGROUND OF THE INVENTION

Digital rights management ("DRM") and enforcement is highly desirable in connection with digital content such as digital audio, digital video, digital text, digital data, digital multimedia, software, etc., where such digital content is to be distributed to one or more users. Digital content could be static, such as a text document, for example, or it could be streamed, such as the streamed audio/video of a live event. In a typical use of a rights-management system, a user receives a piece of digital content via a network (e.g., the Internet), or on a physical medium (e.g., on a disk). Additionally, if the user is permitted to "consume" the content (e.g., play audio or video content, view textual content, execute the software, etc.), the user also receives a license for such content. The rights-management system enforces the requirement that the user can consume the content only when such consumption is permitted by the terms of the license.

Rights management systems typically rely on cryptography in at least two contexts. First, content that needs to be protected is encrypted. Second, given that any meaningful use of encrypted content requires the decryption key, the keys must be distributed only to trusted entities, and cryptographic certificates and signatures are used to establish this trust. In the simplest rights management system, the owner of encrypted content directly verifies the trustworthiness of the consumer of that content, and, if the owner is satisfied of the consumer's trustworthiness, distributes a license containing the decryption key to that consumer. Such a system, however, does not provide rich enough capabilities to be of much commercial significance. Most content —like anything else in commerce—is distributed through a complex chain or web of relationships. For example, the content owner may actually delegate to a distributor the task of issuing licenses (and, thus, keys) for content. In this case, the decoupling of the content owner from the license distributor provides greater flexibility in terms of how content gets distributed (e.g., the content owner does not need to spend time or money distributing content and operating a licensing server). On the other hand, this decoupling also requires that the content owner (who has a proprietary interest in the content) trust the license distributor (who has the power to affect the owner's proprietary interest).

In order to provide digital rights management according to one set of DRM techniques, content is stored only in an encrypted form, and then decrypted for use according to preset policies and an electronic license which defines the specific user's rights to use the content. In this way, persistent policy enforcement and protection of such content is provided at the file level.

This may be implemented using a server component and two client-side components, a rights management client and a security processor. The security processor may also be known in some systems as a "lockbox", "blackbox" or "secure repository." The security processor is a trusted component comprised solely of software, or of a combination of software and hardware. The security processor is responsible for all decryption, signing and policy interpretation. Thus, the security processor is the core security component on the client. Where a public key infrastructure (PKI) system is used to encrypt content, the security processor is the secure container of the unique private key assigned to the client machine, and also secures all other secrets (ex. other keys like the content key and the user's key) that might need to be managed in the process of decrypting the content. Additionally, the security processor allows only processes with the correct security to be running.

Although these components are termed secure, while they are resistant to tampering, breaches of the security may occur. It can be seen that if a vulnerability is found in the secure processor, the security of the DRM system could potentially be subverted. This might allow an attacker to decrypt, publish or redistribute protected content without licensed permission, or to publish or distribute software which allows others to gain unlicensed use of protected content. As a result, keeping the secure processor resistant to such vulnerabilities is critical to the security of the DRM system.

Traditional PKI systems use revocation protocols to respond to subversions of security (a.k.a. security "breaks"). Revocation protocols allow previously-issued credentials (ex. licenses, certificates) or other security-related components (ex. software which validates licenses or manages content) to be invalidated. That is, trust can not be established for licensed use of the DRM system if establishing that trust requires reliance on a revoked entity.

Revocation is accomplished by publishing "revocation lists" of components of the system considered untrustworthy for a given security level, such as compromised keys "broken" software modules, or insufficiently secure execution environments. A DRM client system attempting to validate a given certificate first will consult with a revocation list to determine if the security of any component implicated in establishing trust for the certificate (e.g. the author, publisher, or other grantor or certifier of the certificate) has been compromised. If some element in the certificate chain or other component, such as software involved in validating the certificate, appears in the revocation list, the certificate can not be trusted. One problem with using this revocation system in a DRM system is that the security processor, the very element of the system which may be compromised, is also the element of the system which controls the checking of a revocation list. The security processor or some part of its machine certificate chain may also be the subject of revocation. A compromised element may not be trusted to revoke itself.

Thus, in view of the foregoing, there is a need for a system that overcomes the drawbacks of the prior art.

SUMMARY OF THE INVENTION

In order to allow for security beyond revocation lists, policies regarding the use of content or a server are established. When a request is made, such policies are reviewed. Policies include information regarding requirements for the requester of a resource. If the requester does not meet the policies, the request is not granted. This is termed "exclusion."

The policy is evaluated based on information that is verifiably linked to the requester, and that contains some metadata describing the requester. This is found in an account certificate which is submitted with or as part of the request. The policy is used to decide whether a document which will allow certain rights under certain situations (a "rights document") will be issued. One type of rights document is a use license. A use license can be used to enable a client computer to use some specific content.

As an example of how a policy may act, the policy may allow the issuance of the rights document (such as a use license) only if the requester is running a specific version of an application (i.e. a version without known breaks), or if the requester has a certain piece of hardware installed.

If the request is not granted, the cause of the rejection may be overridden, for example by updating or upgrading some system component (hardware or software) in the requesting system. In certain cases, such an update to overcome a policy-based rejection may be performed transparently to the user. After the update, the request is resubmitted from the requester and if the basis for the rejection has been overcome, and no new bases for a rejection have been introduced, the rights document will be issued.

Other features of the invention are described below.

BRIEF DESCRIPTION OF THE DRAWINGS

The foregoing summary, as well as the following detailed description of the embodiments of the present invention, will be better understood when read in conjunction with the appended drawings. For the purpose of illustrating the invention, there are shown in the drawings embodiments which are presently preferred. As should be understood, however, the invention is not limited to the precise arrangements and instrumentalities shown. In the drawings.

DETAILED DESCRIPTION OF ILLUSTRATIVE EMBODIMENTS

Exemplary Computing Environment

Figure 1:
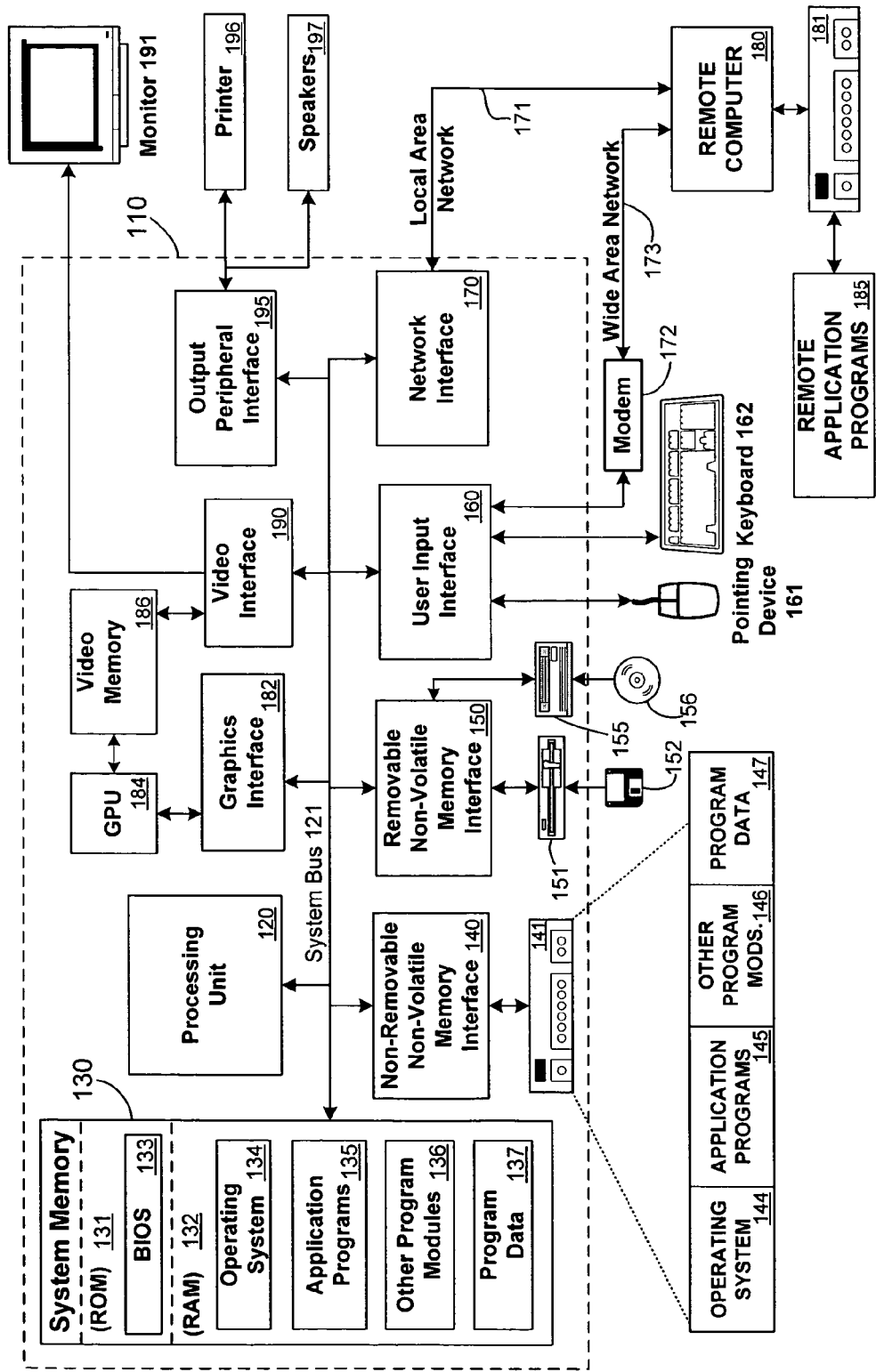
FIG. 1 is a block diagram representing an exemplary non-limiting computing environment in which the present invention may be implemented.

FIG. 1 shows an exemplary computing environment in which aspects of the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, embedded systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The processing unit 120 may represent multiple logical processing units such as those supported on a multi-threaded processor. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus). The system bus 121 may also be implemented as a point-to-point connection, switching fabric, or the like, among the communicating devices.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Enhancing DRM Security through Policy Enforcement

In order to join a DRM system, in some cases, activation is required. As an example, one way in which activation may proceed is where, first, the client computer generates a unique hardware ID for the machine and sends a one-way hash of that ID to an activation server. The activation server generates a random public/private key pair for the machine. The public key is stored in a machine certificate that is signed by the server, and the private key is stored in a security processor. In addition to the public key, the machine certificate also contains the version of security processor which was created for the client computer. The security processor and machine certificate are then returned to the client computer. The security processor is generated uniquely for the requesting machine based on the hardware ID hash which was supplied to the activation server. It can not be used on other machines because the security processor requires an identical ID for proper execution to occur, and the ID is probabilistically unique. In one embodiment, a client machine misrepresenting its hardware ID would be returned a non-functional security processor.

Once activation is complete, certification may be required. The client computer submits the machine certificate and the user's credentials to a certification server. The certification server generates a random public/private key pair for the user, and returns an account certificate for the user. The account certificate contains the public key for the user and the private key encrypted to the public key of the machine certificate. The account certificate also contains certain details about the client computer.

While this may vary among DRM systems, generally, a verifiable account certificate is generated in DRM systems. Any element of a DRM system can be considered an account certificate for the purposes of this invention if it is verifiable, can be traced to a specific user, and contains metadata about the user, the client computer (its hardware and/or software), or the DRM system which is in place. For example, the metadata concerning the security processor could include (but is not limited to) metadata specifying its version, its issuer, its level of assurance, or its time of issuance.

In order to provide enforcement of the components of the system involved in establishing trust (such as the software and the keys) that is effective even where those components may be compromised, exclusion policies are used. All license requests are checked on the license server against the exclusion policy, and only requests which do not violate the exclusion policy will be granted.

Figure 2:
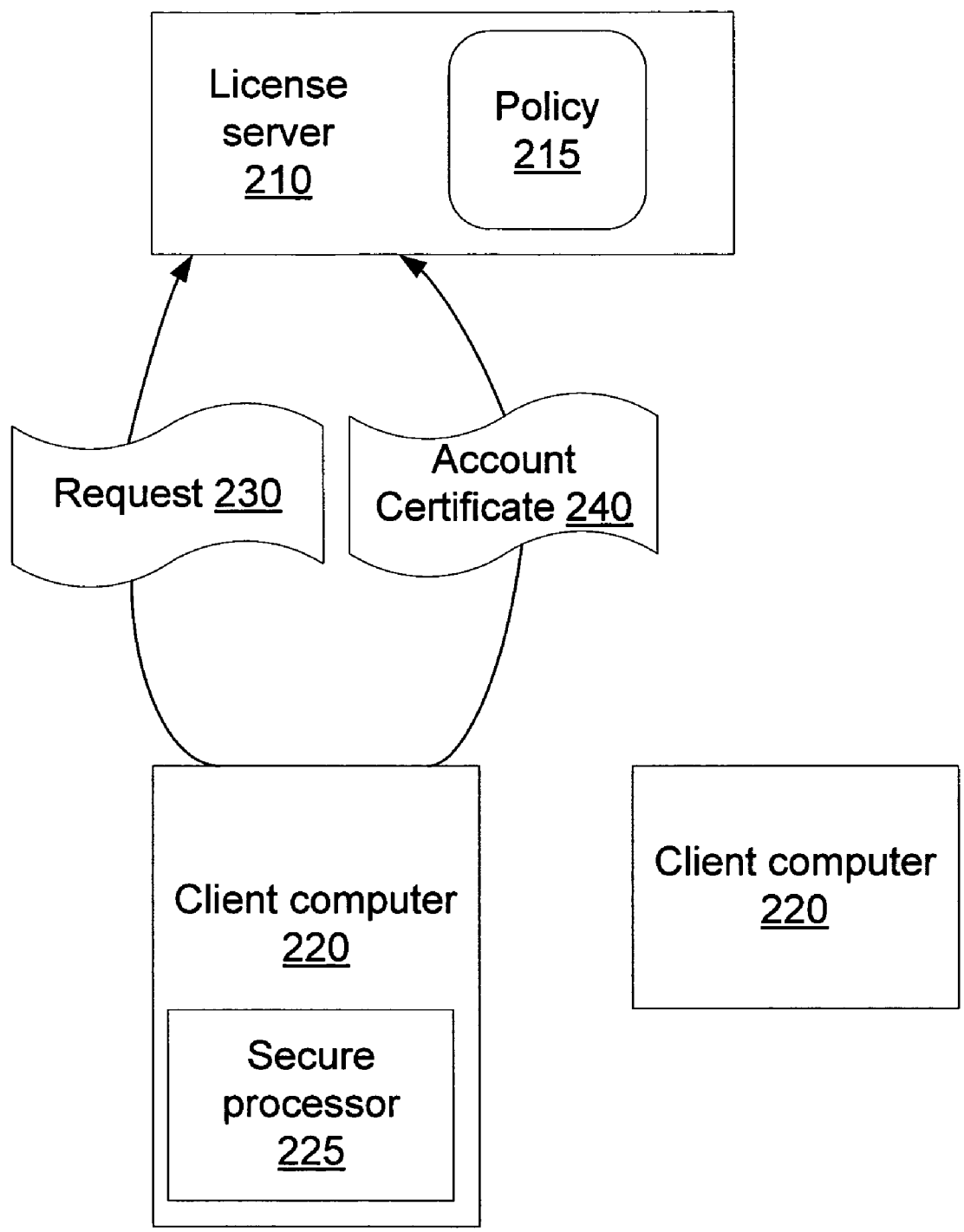
FIG. 2 is a block diagram representing a request being made from a client computer to a licensing server.

FIG. 2 is a block diagram representing a request being made from a client computer to a licensing server. As shown in FIG. 2, a content request 230 is passed from a client computer 220 to the license server 210. Additionally, an account certificate 240 is passed from the client computer 220 to the license server 210. The account certificate contains details regarding the secure processor 225 of client computer 220. (This depiction is merely exemplary; it is contemplated that a license server may be integrated in a client and that functionality may be otherwise combined or distributed between structural components.)

The license server generally determines whether the client computer 220, and more specifically, the secure processor 225, should be granted access to the content according to payment or other licensing arrangements set in place by the owner of the content as discussed above. E.g., when the license server 210 receives such the request 230, the license server 210 determines that the account certificate 240 was signed by a server that the licensor trusts. (The licensor may want to ensure, for example, that the server will be sufficiently rigorous in verifying the entity's identity before issuing such a certificate.)

If the license server 210 trusts the signer of the account certificate 240, then the license server 210 determines whether it can issue a license on behalf of the entity that signed the rights label for the content. In general, a license server can issue licenses based on: (a) rights labels that the server, itself, has issued, and (b) other DRM servers that have shared their private key with the license server 210. (A license server 210 needs the private key of the server that issued the rights label, because the rights label include the content decryption key encrypted by the issuing server's public key; since a license contains the content decryption key encrypted by the public key of the entity certificate, the license server 210 needs the applicable private key in order to decrypt the content key so the content key can be reencrypted with the entity certificate's public key.)

This determination will be necessary in order to issue a license, however, along with the determination of whether the license server 210 can issue a license for the content to the requestor based on the rights information and certificate chains, according to one embodiment of the invention, the license server evaluates information from the account certificate 240 to determine if it meets the policies for that license server 210. If it does (and if other conditions are met, if applicable) the content may be licensed for the secure processor 225. If not, content will not be licensed.

For example, in one embodiment, secure processor 225 is a specific version of secure processor component. Different versions may be provided, new versions providing updated security or other functionality. In such a case, in one example, the policy 215 includes minimum version information. The policy 215 may then require that data identifying the version of secure processor 225 must be included in the account certificate 240, and that the data identify the secure processor 225 as a version as current as the minimum version identified in minimum version information. If the version data is not included in the account certificate 240, or if the version data included in the account certificate 240 does not meet a certain minimum standard identified in the policy, the content will not be licensed to the client computer 220.

Other information in the account certificate 240 may also be considered in the policy. For example, one type of an account certificate is used to bind user accounts to specific computers or groups of computers. A policy may be used to determine whether such an account certificate should be accepted. For example, the policy may require that the account certificate have been created after a specific date. If the account certificate is not new enough to meet the policy's requirements, the request will be denied.

Another possible limitation on issuing licenses which may be governed by a policy is a limitation on the type of hardware or software present on client computer 220. For example, if it is known that a specific operating system lacks signed hashes for major system components, and where such signed hashes are necessary for a security feature, content consumed on that operating system may be less secure. There are other reasons that hardware or software components may be required or excluded. Thus, a policy 215 may ensure that only allowed hardware or software is being used on client computer 220. Such a policy may require that data concerning the hardware and/or software be checked in the account certificate 240 and allow content to be licensed only where the hardware and/or software specified in the account certificate 240 as being used on the client computer 220 is acceptable according to the policy.

Policies may be content-specific or server-specific. If a policy is content-specific, the requirements of the policy must be met in order for the license server 210 to issue a use license which enables the client computer 220 (and secure processor 225) to use the content. If a policy is server-specific, then any requests for content licensed by the license server 210 must be from client computers 220 which can meet the server-specific policy. Any number of server-specific policies may be in force, as well as any number of content-specific policies—the limitations of all policies must be met in order for a use license to be sent to the client computer 220.

In addition to licensing requests, other requests may be subject to policies. Generally, requests in a DRM system are made for a rights document. A rights document is data which allows or enhances the recipient's performance of some DRM function. Any request for a rights document may, according to the techniques of the invention, be made contingent on a policy.

For example, there may be cases in which a server is used to serve activation requests, as described above. Certification requests may also be made for a certification server to certify some aspect of another component of a DRM system.

While the description above, relating to FIG. 2, focuses on the case where the request being made is a licensing request and, and where the rights document is a use license which allows the use of content, it can be seen that any time a request is made for any rights document, according to the invention, the recipient of the request may enforce a policy which requires that certain metadata about the requestor be examined and certain conditions based on that metadata be satisfied before the rights document request is served. Rights documents including: use licenses for content, machine activation certificates, account certificates, or any other element of the DRM system which is requested from a request-granting entity in order to allow or facilitate some functionality within the DRM system.

Figure 3:
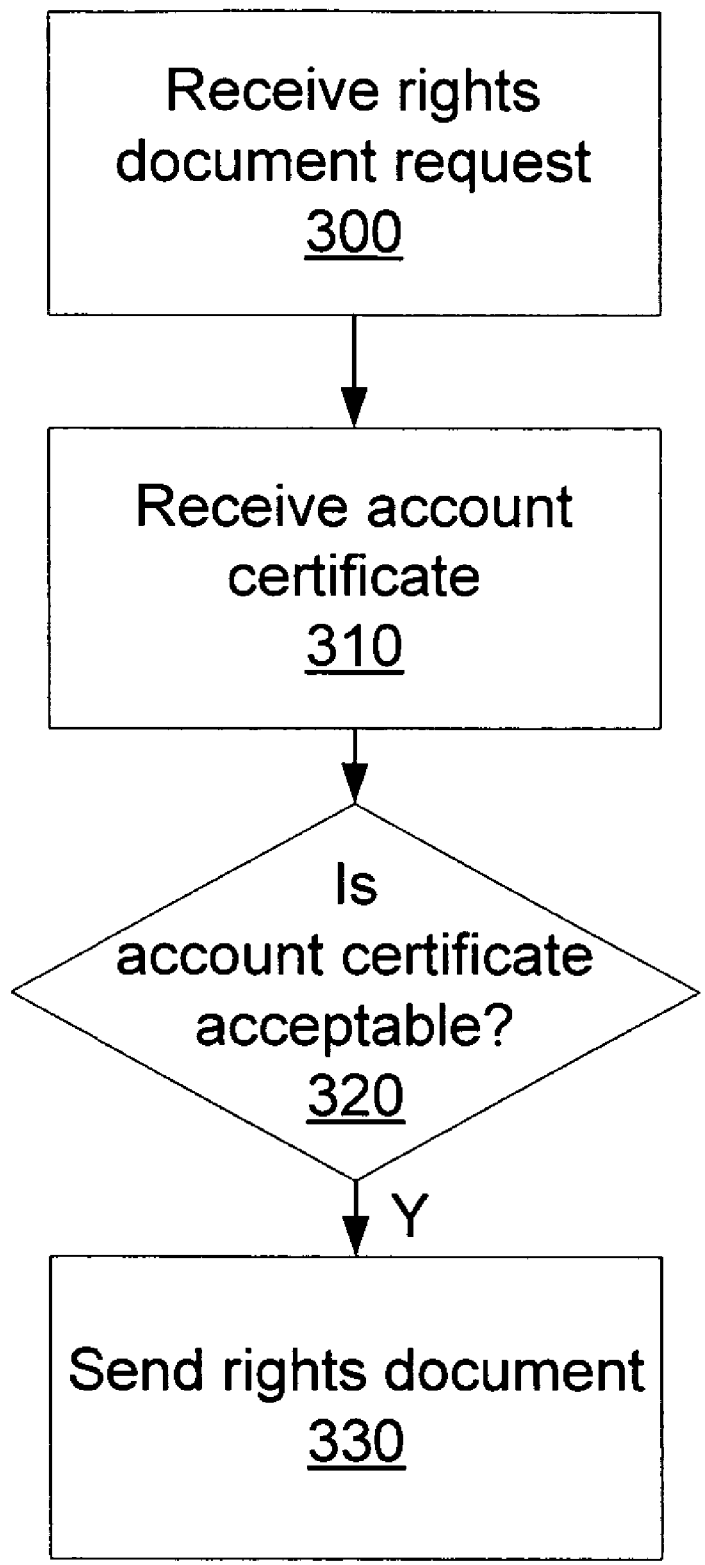
FIG. 3 is a flow diagram describing the actions of a recipient of a request for a rights document according to one embodiment of the invention.

FIG. 3 is a flow diagram describing the actions of a recipient of a request for a rights document according to one embodiment of the invention. As shown in FIG. 3, a rights document request is received from a client system in step 300. An account certificate is also received from the client system in step 310. While these steps are shown in FIG. 3 as occurring with step 300 occurring before step 310, this is not essential, and the steps may happen contemporaneously or in either order. In step 320, the account certificate is analyzed to determine if it is acceptable according to a policy. If it is, step 330, then a rights document is sent to the client system.

Figure 4:
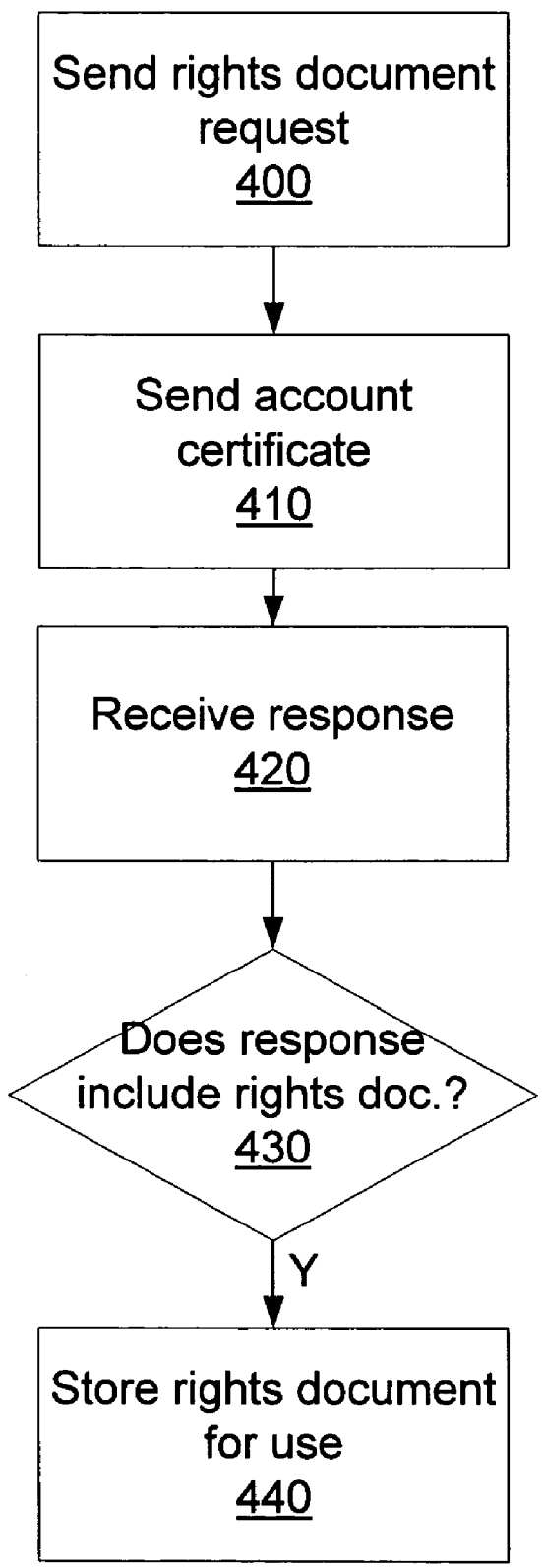
FIG. 4 is a flow diagram describing the actions of an issuer of a request for a rights document according to one embodiment of the invention.

FIG. 4 is a flow diagram describing the actions of an issuer of a request for a rights document according to one embodiment of the invention. As shown in FIG. 4, a rights document request is sent in step 400. An account certificate is also sent in step 410. This account certificate includes metadata concerning the issuer of the request. A response is received in step 420. If the response comprises a rights document, step 430, the rights document is stored for use, step 440.

Figure 5:
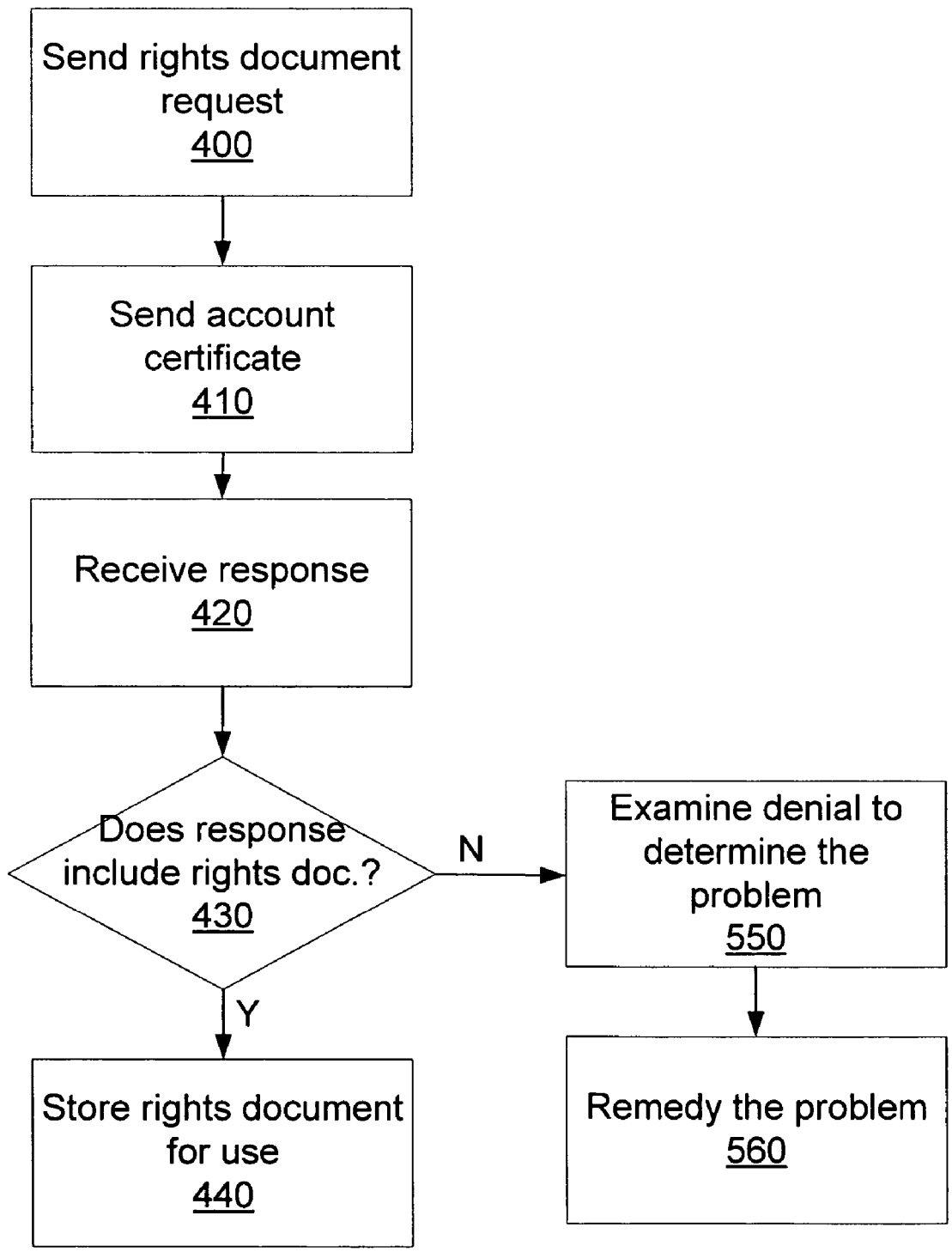
FIG. 5 is a flow diagram describing the actions of an issuer of a request for a rights document where a denial triggers a resolution of the problem.

In one embodiment, when a rights document is not granted in response to a request, a resolution of the problematic element ensues. Where possible, in one embodiment, this resolution occurs automatically, either without notice to a user or without requiring extensive user input. FIG. 5 is a flow diagram describing the actions of an issuer of a request for a rights document where a denial triggers a resolution of the problem. Steps 400, 410, 420, 430 and 440 are as shown in FIG. 4. As shown in FIG. 5, in one embodiment, if the response comprises a denial, the denial is examined to determine the problem, step 550. If it is possible, the problem is remedied in step 560. This may not be possible, e.g. if the denial was based on a hardware element of client computer 220, it may be impossible to remedy the problem. Where there is no way to remedy the problem, or where the user is to be informed of the reason for denial, one embodiment of the invention prepares data regarding the denial for display to a user, e.g. by displaying the information regarding the denial, by adding the data to a log file, etc.

As an example, a policy may be expressed in a markup language file as shown in Table 1.

TABLE 1

Example Policy Specification

```
<BODY>
  ...
  <POLICYLIST type="exclusion">
    <POLICY>
      <OBJECT>
        <ID type="filename">application.exe</ID>
        <VERSIONSPAN min="0"
        max="1.2.0.4025"/>
      </OBJECT>
    </POLICY>
    ...
  </POLICYLIST>
  ...
</BODY>
```

In Table 1, the POLICYLIST specifies that the policy is one of exclusion. One policy included in the policylist checks for a file named "application.exe" and to make sure that the version is later than version 1.2.0.4025. All versions of the file application. exe up to and including version 1.2.0.4025 will be excluded when this policy is enforced. A range may be specified, as indicated above. Additionally, a single version may be excluded, a list of specific versions. In addition to file versions exclusions, other exclusions may also be made in a policy. For example, exclusions based on the type of operating system, or on hardware parameters present in the client computer 220 may be made.

Policies can use any available information about the request or the requester, in any combination, in order to specify who will be permitted or who will be denied the rights document requested.

CONCLUSION

The programming necessary to effectuate the processes performed in connection with the present invention is relatively straight-forward and should be apparent to the relevant programming public. Accordingly, such programming is not attached hereto. Any particular programming, then, may be employed to effectuate the present invention without departing from the spirit and scope thereof.

Moreover, those skilled in the art will appreciate that numerous changes and modifications can be made to the preferred embodiments of the invention, and that such changes and modifications can be made without departing from the spirit of the invention. It is intended, therefore, that the appended claims cover all such equivalent variations as fall within the true spirit and scope of the invention.

What is claimed:

1. A method implemented on at least one computing system for responding to a request for a rights document according to a policy, said rights document for use on a client system, said policy specifying requirements of said client system, wherein said client system comprises a secure component and an account certificate corresponding to said secure component and comprising certain metadata concerning said client system, said method comprising:

receiving a request for a rights document from said client system;

receiving said account certificate from said client system;

analyzing said metadata concerning said client system in said account certificate to determine if certain conditions based on said metadata in said account certificate are satisfied according to said policy; if said certain conditions are satisfied according to said policy, sending said rights document to said client system.

2. The method of claim 1, where said rights document is a use license, and where said use license enables said secure component to allow use of corresponding content.

3. The method of claim 2, further comprising:

receiving a publishing license from said client system, where said publishing license contains data describing said policy for said content.

4. The method of claim 3, where said publishing license comprises encrypted data comprising a content key for decrypting an encrypted version of said content, and where said use license comprises a version of said content key which can be used by said secure component.

5. The method of claim 4, where said version of said content key is encrypted such that which said secure component can decrypt said version of said content key.

6. The method of claim 1, where said rights document is a certificate, and where said certificate certifies an aspect of said client system.

7. The method of claim 1, where said rights document is a machine certificate.

8. The method of claim 1, where said server stores policy data describing said policy.

9. The method of claim 1, where said metadata comprises data describing a software element of said client computer.

10. The method of claim 9, where said software element is an operating system.

11. The method of claim 9, where said software element is said secure component.

12. The method of claim 1, where said metadata comprises data describing a hardware element of said client computer.

13. A method implemented on at least one computing system for requesting a rights document for use on a client system, where said client system comprises a secure component and an account certificate corresponding to said secure component, said method comprising:
sending a request for said rights document;
sending a request comprising an account certificate, said account certificate corresponding to said secure component and comprising certain metadata concerning said client system;
receiving a response to said request;
if said response comprises a rights document, storing said rights document;
if said response comprises a denial pursuant to a policy which excludes said client based on said metadata concerning said client system in said account certificate, determining a cause for said denial; and
performing a corrective action to correct said cause for said denial.

14. The method of claim 13, further comprising:
sending a second request for said rights document.

15. The method of claim 14, where said corrective action comprises an update to said secure component.

16. The method of claim 15, where said update of said secure component comprises: requesting updated secure component data from an activation server;
using said updated secure component data to update said secure component.

17. The method of claim 16, where said updated secure component data comprises an updated secure component, and where said use of said updated secure component data comprises:
replacing said secure component with said updated secure component.

18. The method of claim 13, further comprising:
if said response comprises a denial, displaying for a user data relating to said denial.

19. A system for granting fights documents, said system comprising:
a computing processor adapted to execute computer-readable instructions; and
memory communicatively coupled with said computing processor, said memory comprising computer-readable instructions for performing the following:
receiving a request for a rights document and an account certificate corresponding to a secure component for which rights are requested, the account certificate comprising certain metadata about a client system;
determining whether said metadata concerning said client system in said account certificate meets certain conditions based on the metadata and the requirements of the policy under which said rights document is to be granted; and
granting said fights document if said policy evaluator determines that said certain conditions are satisfied.

20. The system of claim 19, where said rights document is a use license, and where said use license enables said secure component to allow use of corresponding content.

21. The system of claim 20, said memory further comprising instructions for receiving a publishing license from said client system, where said publishing license contains data describing said policy for said content.

22. The system of claim 21, where said publishing license comprises encrypted data comprising a content key for decrypting an encrypted version of said content, and where said use license comprises a version of said content key which can be used by said secure component.

23. The system of claim 22, where said version of said content key is encrypted such that which said secure component can decrypt said version of said content key.

24. The system of claim 19, where said rights document is a certificate, and where said certificate certifies an aspect of said client system.

25. The system of claim 19, where said fights document is a machine certificate.

26. The system of claim 19, said memory further comprising policy data describing said policy.

27. The system of claim 19, where said metadata comprises data describing a software element of said client computer.

28. The system of claim 27, where said software element is an operating system.

29. The system of claim 27, where said software element is said secure component.

30. The system of claim 19, where said metadata comprises data describing a hardware element of said client computer.

31. A computer readable medium comprising computer executable instructions for responding to a request for a rights document according to a policy, said rights document for use on a client system, said policy specifying requirements of said client system, wherein said client system comprises a secure component and an account certificate corresponding to said secure component and comprising certain metadata concerning said client system, said instructions comprising instructions for:
receiving a request for a rights document from said client system;
receiving said account certificate from said client system;
analyzing said metadata concerning said client system in said account certificate to determine if certain conditions based on said metadata in said account certificate are satisfied according to said policy;
if said certain conditions are satisfied according to said policy, sending said rights document to said client system.

32. The computer readable medium of claim 31, further comprising instructions for:
receiving a publishing license from said client system, where said publishing license contains data describing said policy for said content.

33. A computer readable medium comprising computer executable instructions for requesting a rights document for use on a client system, where said client system comprises a secure component and an account certificate corresponding to said secure component, said instructions comprising instructions for:
sending a request for said rights document;
sending a request comprising an account certificate, said account certificate corresponding to said secure component and comprising certain metadata concerning said client system;
receiving a response to said request;
if said response comprises a rights document, storing said rights document;

if said response comprises a denial pursuant to a policy which excludes said client based on said metadata concerning said client system in said account certificate, determining a cause for said denial; and performing a corrective action to correct said cause for said denial.

34. The computer readable medium of claim 33, further comprising instructions for:

sending a second request for said rights document.

* * * * *

UNITED STATES PATENT AND TRADEMARK OFFICE
CERTIFICATE OF CORRECTION

PATENT NO. : 7,376,975 B2  Page 1 of 1
APPLICATION NO. : 10/842061
DATED : May 20, 2008
INVENTOR(S) : Philip Lafornara et al.

It is certified that error appears in the above-identified patent and that said Letters Patent is hereby corrected as shown below:

In column 11, line 47, in Claim 19, delete "fights" and insert -- rights --, therefor.

In column 11, line 63, in Claim 19, delete "fights" and insert -- rights --, therefor.

In column 12, line 16, in Claim 25, delete "fights" and insert -- rights --, therefor.

Signed and Sealed this
Nineteenth Day of July, 2011

David J. Kappos
*Director of the United States Patent and Trademark Office*